US012570925B2

(12) United States Patent
Valdes Vergara et al.

(10) Patent No.: US 12,570,925 B2
(45) Date of Patent: Mar. 10, 2026

(54) EFFERVESCENT COMPOSITIONS AND SOLUTIONS PREPARED FROM THE SAME

(71) Applicant: Colgate-Palmolive Company, New York, NY (US)

(72) Inventors: Maria Antonieta Valdes Vergara, Mexico City (MX); Henry Pena, Edo México (MX); Jorge Antonio Maldonado Ortega, Delegacion Miguel Hidalgo CP (MX)

(73) Assignee: Colgate-Palmolive Company, New York, NY (US)

( * ) Notice: Subject to any disclaimer, the term of this patent is extended or adjusted under 35 U.S.C. 154(b) by 572 days.

(21) Appl. No.: 17/991,221

(22) Filed: Nov. 21, 2022

(65) Prior Publication Data

US 2023/0159857 A1 May 25, 2023

Related U.S. Application Data

(60) Provisional application No. 63/281,845, filed on Nov. 22, 2021.

(51) Int. Cl.

| | |
|---|---|
| ***C11D 3/00*** | (2006.01) |
| ***C11D 1/08*** | (2006.01) |
| ***C11D 1/83*** | (2006.01) |
| ***C11D 3/04*** | (2006.01) |
| ***C11D 3/10*** | (2006.01) |
| ***C11D 3/20*** | (2006.01) |
| ***C11D 3/22*** | (2006.01) |
| ***C11D 3/37*** | (2006.01) |
| ***C11D 11/00*** | (2006.01) |
| *C11D 1/72* | (2006.01) |

(52) U.S. Cl.

CPC .............. *C11D 3/0094* (2013.01); *C11D 1/83* (2013.01); *C11D 3/046* (2013.01); *C11D 3/10* (2013.01); *C11D 3/2086* (2013.01); *C11D 3/226* (2013.01); *C11D 3/3707* (2013.01); *C11D 3/3776* (2013.01); *C11D 11/0082* (2013.01); *C11D 1/72* (2013.01)

(58) Field of Classification Search

CPC ........... C11D 3/0094; C11D 1/83; C11D 3/10; C11D 3/046

See application file for complete search history.

(56) References Cited

U.S. PATENT DOCUMENTS

| | | | | |
|---|---|---|---|---|
| 5,336,432 A * | 8/1994 | Petchul | C01B 15/01 516/902 |
| 5,575,948 A * | 11/1996 | Petchul | C11D 17/003 252/186.28 |
| 6,121,215 A | 9/2000 | Rau | |
| 6,355,607 B1 | 3/2002 | Rahman et al. | |
| 6,939,841 B2 | 9/2005 | Requejo | |
| 10,774,290 B2 | 9/2020 | Caparrós Casco | |
| 11,077,034 B2 * | 8/2021 | Erkens | C11D 3/2013 |
| 2005/0183631 A1 * | 8/2005 | Law | C11D 7/5013 106/38 |
| 2009/0032063 A1 * | 2/2009 | Haas | C11D 7/3245 510/445 |
| 2018/0105766 A1 * | 4/2018 | Caparrós Casco | C11D 17/0073 |
| 2023/0159857 A1 * | 5/2023 | Valdes Vergara | C11D 3/2075 510/395 |

FOREIGN PATENT DOCUMENTS

| | | | |
|---|---|---|---|
| CA | 2315137 | 2/2001 | |
| CA | 2315137 A1 * | 2/2001 | C11D 17/0056 |
| CN | 109234089 | 1/2019 | |
| EP | 0922756 | 6/1999 | |
| EP | 2933002 A1 * | 10/2015 | A61K 31/4439 |
| WO | 1987/002052 | 4/1987 | |
| WO | WO-8702052 A1 * | 4/1987 | |
| WO | 2002/086048 | 10/2002 | |
| WO | WO-02086048 A1 * | 10/2002 | A01N 47/44 |
| WO | 2020/113484 | 6/2020 | |
| WO | WO-2020113484 A1 * | 6/2020 | |

OTHER PUBLICATIONS

International Search Report and the Written Opinion of the International Searching Authority issued in International Application PCT/US2022/050566 mailed May 8, 2023.

* cited by examiner

*Primary Examiner* — Mark Eashoo
*Assistant Examiner* — M. Reza Asdjodi

(57) ABSTRACT

Effervescent compositions for preparing home care products and methods for preparing the same are disclosed. The effervescent compositions may include an effervescent base, one or more surfactants, one or more solidifying agents, and one or more disintegrant agents. The effervescent base may include one or more alkali metal carbonates and one or more acids. The one or more alkali metal carbonates and the one or more acids may be present in a weight ratio of from about 1:1 to about 5:1. The effervescent composition may be substantially free of water. The effervescent composition may have a dissolution time of from about 6 min to about 12 min. The method for preparing the effervescent composition may include contacting the effervescent base, the surfactants, the solidifying agents, and the disintegrant agents with one another to prepare a mixture, which may be a homogenous mixture.

17 Claims, No Drawings

EFFERVESCENT COMPOSITIONS AND SOLUTIONS PREPARED FROM THE SAME

CROSS-REFERENCE TO RELATED APPLICATIONS

This application claims the benefit of U.S. Provisional Patent Application No. 63/281,845, filed on Nov. 22, 2021, which is incorporated herein by reference to the extent consistent with the present disclosure.

BACKGROUND

Conventional home care products, such as hard surface cleaners and compositions thereof, often utilize water as the primary vehicle or solution to contain the active ingredients. For example, in some instances, hard surface cleaning compositions may include water in an amount up to or greater than 85 or 90 wt %. The utilization of water in conventional home care products often results in increased costs. For example, the water utilized in the manufacture of the home care products often requires processing prior to use. Further, transporting the home care products that incorporate relatively large volumes of water also increases the overall cost to deliver the products to the consumer. In another example, the packaging of the home care products that utilize large volumes of water must also be sized to accommodate the increased volume. These aforementioned costs may often result in increased cost to consumers.

In view of the foregoing, home care products in the form of dissolvable or effervescent tablets have been developed. Conventional home care products in the form of dissolvable tablets, however, may often require lengthy times for dissolution.

What is needed, then, are improved home care products in the form of dissolvable or effervescent tablets and methods for the same.

BRIEF SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing an effervescent composition for preparing a home care product. The effervescent compositions may include an effervescent base, one or more surfactants, one or more solidifying agents, and one or more disintegrant agents. The effervescent base may include one or more alkali metal carbonates and one or more acids. The one or more alkali metal carbonates and the one or more acids may be present in a weight ratio of from about 1:1 to about 5:1. The effervescent composition may be substantially free of water. The effervescent composition may have a dissolution time of from about 6 min to about 12 min.

In at least one example, the alkali metal carbonates may include one or more of sodium carbonate, sodium bicarbonate, potassium carbonate, potassium bicarbonate, or combinations thereof, preferably, the alkali metal carbonates comprise sodium bicarbonate.

In at least one example, the one or more acids may include a monoprotic acid, a polyprotic acid, or combinations thereof, optionally, the one or more acids may include one or more of citric acid, malic acid, fumaric acid, succinic acid, tartaric acid, lactic acid, oxalic acid, or combinations thereof. Preferably, the one or more acids may include citric acid.

In at least one example, the alkali metal carbonates may be present in an amount of from about 5 weight % to about 75 weight %, preferably about 10 weight % to about 40 weight %, more preferably about 25 weight % to about 32 weight %, or more preferably about 27 weight % to about 30 weight %, based on a total weight of the effervescent composition.

In at least one example, the one or more acids may be present in an amount of from about 5 weight % to about 13 weight %, preferably about 8 weight % to about 12 weight %, more preferably about 9 weight % to about 11 weight %, even more preferably about 10 weight %, based on a total weight of the effervescent composition.

In at least one example, the one or more alkali metal carbonates and the one or more acids may be present in a weight ratio of from about 2.5:1 to 3:1, preferably about 2.6:1 to about 2.9:1, more preferably about 2.7:1 to about 2.8:1.

In at least one example, the one or more surfactants may include an anionic surfactant, optionally, the anionic surfactant may include sodium lauryl sulfate.

In at least one example, the one or more surfactants may include a nonionic surfactant, preferably, the nonionic surfactant may include higher aliphatic, primary alcohols, more preferably, the nonionic surfactant may include higher aliphatic, C9-C15 primary alcohols, even more preferably, the nonionic surfactant may include a reaction product of C9-C11 alkanol and 2.5-10 moles of ethylene oxide.

In at least one example, the one or more surfactants may be present in an amount of from about 5 weight % to about 50 weight %, about 15 weight % to about 40 weight %, about 20 weight % to about 35 weight %, about 20 weight % to about 30 weight %, preferably, about 25 weight % to about 30 weight %, based on the total weight of the effervescent composition.

In at least one example, the one or more disintegrant agents may include one or more of sodium starch glycolate, a crosslinked polyvinylpyrrolidone, or combinations thereof, more preferably, the crosslinked polyvinylpyrrolidone may include 1-ethenylpyrrolidin-2-one.

In at least one example, the disintegrant may be present in an amount of from greater than 0 weight % to about 10 weight %, preferably, about 2 weight % to about 5 weight %, more preferably, about 3 weight % to about 4 weight %, based on the total weight of the effervescent home care composition.

In at least one example, the one or more solidifying agents may include one or more of polypropylene glycol, polypropylene glycol polyoxyalkylene, polyethylene glycol, or combinations thereof, preferably the one or more solidifying agents may include polypropylene glycol and polyethylene glycol.

In at least one example, the one or more solidifying agents may be present in an amount of from about 20 weight % to about 35 weight %, or more preferably about 25 weight % to about 30 weight %, based on the total weight of the effervescent composition.

In at least one example, the polypropylene glycol and the polyethylene glycol may be present in a weight ratio of from 0.8:1 to 3:1, from 0.8:1 to 2.5:1, preferably from 0.8:1 to 1.8:1, more preferably from 0.8:1 to 1.5:1.

In at least one example, the effervescent composition may include one or more descaling agents, preferably the descaling agents may include one or more organic acids, optionally, the one or more descaling agents may be present in an amount of from greater than 0 weight % to 5 weight %, preferably from greater than 0 weight % to about 2 weight %, more preferably from greater than 0 weight % to about 1 weight %, based on the total weight of the effervescent composition.

In at least one example, the effervescent composition may include one or more abrasive agents, preferably, the one or more abrasive agents may include sodium chloride.

In at least one example, the effervescent composition may be a solid formed article, optionally, wherein the solid formed article may be a tablet, a cast article, or a bar.

The foregoing and/or other aspects and utilities embodied in the present disclosure may be achieved by providing a method for preparing the effervescent compositions disclosed herein. The method may include contacting the effervescent base, the surfactants, the solidifying agents, and the disintegrant agents with one another to prepare a mixture, preferably, the mixture is a homogenous mixture.

In at least one example, the method may include forming a solid formed article from the mixture. The solid formed article may be formed from casting, melt casting, pressing, or extruding.

The foregoing and/or other aspects and utilities embodied in the present disclosure may be achieved by providing a method for preparing a home care product. The method may include contacting the effervescent composition disclosed herein with a solvent. In at least one example, the solvent may include water.

Further areas of applicability of the present disclosure will become apparent from the detailed description provided hereinafter. It should be understood that the detailed description and specific examples, while indicating some typical aspects of the disclosure, are intended for purposes of illustration only and are not intended to limit the scope of the disclosure.

DETAILED DESCRIPTION

The following description of various typical aspect(s) is merely exemplary in nature and is in no way intended to limit the disclosure, its application, or uses.

As used throughout this disclosure, ranges are used as shorthand for describing each and every value that is within the range. It should be appreciated and understood that the description in a range format is merely for convenience and brevity, and should not be construed as an inflexible limitation on the scope of any embodiments or implementations disclosed herein. Accordingly, the disclosed range should be construed to have specifically disclosed all the possible subranges as well as individual numerical values within that range. As such, any value within the range may be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Unless otherwise specified, all percentages and amounts expressed herein and elsewhere in the specification should be understood to refer to percentages by weight. The amounts given are based on the active weight of the material.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

As used herein, "free" or "substantially free" of a material may refer to a composition, component, or phase where the material is present in an amount of less than 10.0 weight %, less than 5.0 weight %, less than 3.0 weight %, less than 1.0 weight %, less than 0.1 weight %, less than 0.05 weight %, less than 0.01 weight %, less than 0.005 weight %, or less than 0.0001 weight % based on a total weight of the composition, component, or phase.

All references cited herein are hereby incorporated by reference in their entireties. In the event of a conflict in a definition in the present disclosure and that of a cited reference, the present disclosure controls.

The present inventors have surprisingly and unexpectedly discovered that the effervescent home care compositions disclosed herein exhibited enhanced or relatively faster dissolution time as compared to conventional effervescent home care compositions. It was also surprisingly and unexpectedly discovered that the inclusion of a disintegrant agent, such as polyvinylpyrrolidone, improved dissolution time. It was further surprisingly and unexpectedly discovered that the inclusion of and/or the amount of sodium chloride may be modified to control the dissolution time of the effervescent home care composition.

Compositions

Compositions disclosed herein may be or include a home care product or a home care composition thereof. For example, compositions disclosed herein may be a home care composition, a home care product, or form a portion of the home care composition or the home care product. The home care compositions disclosed herein may include effervescent home care compositions including an effervescent base or carrier, one or more surfactants (e.g., cleaning agents), one or more solidifying agents (e.g., cross-linkers), one or more descaling agents, one or more chelating agents, one or more abrasives (i.e., sodium bicarbonate and/or sodium chloride), one or more disintegrant agents, one or more fragrances, one or more colorants (e.g., dyes), or any combination thereof. As further discussed herein, the effervescent home care compositions may be free or substantially free of water. The home care compositions disclosed herein may also include respective solutions formed or prepared from the effervescent home care compositions disclosed herein. For example, the home care compositions disclosed herein may also include respective solutions formed or prepared from combining, mixing, or otherwise contacting the effervescent home care compositions with a solution or solvent, such as water (e.g., tap water). In at least one implementation, all or substantially all the ingredients/components of the effervescent home care compositions and/or the solutions prepared from the effervescent home care compositions are biodegradable.

The effervescent home care compositions may be free or substantially free of water. For example, the effervescent home care compositions may include water in an amount of less than 10.0 weight %, less than 5.0 weight %, less than 3.0 weight %, less than 1.0 weight %, less than 0.1 weight %, less than 0.05 weight %, less than 0.01 weight %, less than 0.005 weight %, less than 0.0001 weight %, or less, based on a total weight of the effervescent home care compositions. Providing the effervescent home care compositions as being free or substantially free of water reduces the weight of the compositions for transport (e.g., from a manufacturing facility to a store and/or from a store to a consumer's home). Providing the effervescent home care compositions as being free or substantially free of water also reduces the space necessary for storage. The effervescent home care compositions may also be anhydrous. As used herein, the term "anhydrous" should be understood and interpreted to have a meaning consistent with the understanding of the word by those skilled in the art.

The effervescent home care compositions disclosed herein may be provided in varying forms. In one example, the effervescent home care compositions disclosed herein may be in the form of granules or powders. In another example, the effervescent home care compositions disclosed herein may be a solid formed article. For example, the solid article may be in the form of a tablet, such as a pressed tablet, a bar (e.g., bar formed from a plurality of tablets), an extruded article, or a cast article. The effervescent home care compositions may be processed to prepare the solid articles. Illustrative processes may include casting (e.g., melt casting), pressing, molding, extruding, or the like. In a preferred implementation, the effervescent home care compositions may be prepared as bars that may be separated (e.g., broken, fractured, etc.) into pre-sized tablets or doses.

The solid articles may have a density of from about 0.05 grams per cubic centimeters ($g/cm^3$), about 0.1 $g/cm^3$, about 0.3 $g/cm^3$, about 0.6 $g/cm^3$, about 0.9 $g/cm^3$, or about 1.0 $g/cm^3$ to about 1.3 $g/cm^3$, about 1.6 $g/cm^3$, about 2.0 $g/cm^3$, or greater. The solid articles may have a weight of from about 3 grams (g), about 4 g, about 5 g, or about 6 g to about 7 g, about 8 g, about 9 g, about 10 g, about 12 g, about 15 g, or greater.

In at least one implementation, the effervescent home care compositions disclosed herein may be disposed or packaged in a container, such as an airtight container. Illustrative containers may include, but are not limited to, a retort pouch, a sachet, a TETRA PAK®, a bottle, a tray, a metal can (e.g., tin can), or the like, or combinations thereof. In at least one implementation, the effervescent home care composition may be disposed in a retort pouch or a sachet that is portable and/or disposable. It should be appreciated that each of the containers may include any number of servings or doses of the effervescent home care composition. For example, each container may include a single dose or multiple doses.

The effervescent base may be capable of or configured to provide a vehicle or carrier or a portion of the vehicle or carrier for the remaining components of the effervescent home care composition. The effervescent base may also be capable of or configured to aid or facilitate the dissolution of the effervescent home care composition in a solvent, such as water, when contacted therewith. For example, contacting the effervescent base with water may generate carbon dioxide. In at least one implementation, the generation of carbon dioxide in water may provide sufficient agitation to facilitate or aid in the dissolution of the effervescent home care composition or the components thereof such that external agitation (e.g., shaking, stirring, swirling, etc.) is not necessary or is minimized. In another implementation, mild agitation, such as shaking, stirring, swirling, etc. may be implemented to aid or facilitate dissolution of the effervescent home care composition in water.

The effervescent base may include one or more alkali metal carbonates, one or more acids, or combinations thereof. Illustrative alkali metal carbonates may be or include, but are not limited to, one or more of sodium carbonate, sodium bicarbonate, potassium carbonate, potassium bicarbonate, or the like, or combinations thereof. The one or more acids may be or include monoprotic acids, polyprotic acids, or combinations thereof. The one or more acids may be or include acids or salts thereof. Illustrative acids may be or include, but are not limited to, one or more of citric acid, malic acid, fumaric acid, succinic acid, tartaric acid, lactic acid, oxalic acid, of the like, or combinations thereof. In an exemplary implementation, the effervescent base includes a combination of sodium bicarbonate and citric acid.

In at least one implementation, the one or more alkali metal carbonates may be present in an amount of from about 5 weight % to about 75 weight %, based on a total weight of the effervescent home care composition. For example, the one or more alkali metal carbonates may be present in an amount of from about 5 weight %, about 10 weight %, about 15 weight %, about 20 weight %, or about 25 weight % to about 30 weight %, about 35 weight %, about 40 weight %, about 45 weight %, about 50 weight %, about 55 weight %, about 60 weight %, about 65 weight %, about 70 weight %, or about 75 weight %, based on a total weight of the effervescent home care composition. In a preferred embodiment, the one or more alkali metal carbonates may be present in an amount of from about 10 weight % to about 40 weight %, about 20 weight % to about 32 weight %, about 25 weight % to about 32 weight %, or about 27 weight % to about 30 weight %, based on a total weight of the effervescent home care composition.

In another implementation, the one or more alkali metal carbonates may be present in an amount of from about 25 weight % to about 34 weight %, based on a total weight of the effervescent home care composition. For example, the one or more alkali metal carbonates may be present in an amount of from about 25 weight %, about 26 weight %, about 27 weight %, about 28 weight % to about 29 weight %, about 30 weight %, 31 weight %, about 32 weight %, about 33 weight %, or about 34 weight %, based on a total weight of the effervescent home care composition. In a preferred implementation, the one or more alkali metal carbonates may be present in an amount of from about 10 to about 40, more preferably about 25 weight % to about 32 weight %, even more preferably about 27 weight % to about 30 weight %, based on a total weight of the effervescent home care composition.

In at least one implementation, the one or more acids may be present in an amount of from about 5 weight % to about 75 weight %, based on a total weight of the effervescent home care composition. For example, the one or more acids may be present in an amount of from about 5 weight %, about 10 weight %, about 15 weight %, about 20 weight %, about 25 weight %, about 30 weight %, about 35 weight %, about 40 weight %, about 45 weight %, or about 50 weight % to about 55 weight %, about 60 weight %, about 65 weight %, about 70 weight %, or about 75 weight %, based on a total weight of the effervescent home care composition.

In another implementation, the one or more acids may be present in an amount of from about 1 weight % to about 15 weight %, based on a total weight of the effervescent home care composition. For example, the one or more acids may be present in an amount of from about 1 weight %, about 2 weight %, about 3 weight %, about 4 weight %, about 5 weight %, about 6 weight %, about 7 weight %, about 8 weight %, or about 9 weight % to about 10 weight %, about 11 weight %, about 12 weight %, about 13 weight %, about 14 weight %, about 15 weight %, based on a total weight of the effervescent home care composition. In an exemplary implementation, the one or more acids may be present in an amount of from about 5 weight % to about 13 weight %, about 8 weight % to about 12 weight %, about 9 weight % to about 11 weight %, or about 10 weight %, based on the total weight of the effervescent home care composition.

In at least one implementation, the combined weight of the effervescent base, including the one or more acids and the one or more alkali metal carbonates, may be in an amount of from about 1 weight % to about 80 weight % or about 5 weight % to about 45 weight %, based on the total weight of the effervescent home care composition. For example, the combined weight of the one or more acids and the one or more alkali metal carbonates may be present in an amount of from about 30 weight %, about 31 weight %, about 32 weight %, about 33 weight %, about 34 weight %, about 35 weight %, about 36 weight %, about 37 weight %, about 38 weight %, about 39 weight %, or about 40 weight % to about 41 weight %, about 42 weight %, about 43 weight %, about 44 weight %, about 45 weight %, based on the total weight of the effervescent home care composition. In another example, the combined weight of the one or more acids and the one or more alkali metal carbonates may be present in an amount of from about 35 weight % to about 45 weight %, about 37 weight % to about 44 weight %, about 38 weight % to about 43 weight %, about 39 weight % to about 42 weight %, or about 40 weight % to about 41 weight %, based on the total weight of the effervescent home care composition. The total weight of the effervescent base, including the one or more acids and the one or more alkali metal carbonates, may at least partially determine a dissolution time or minimum dissolution time of the effervescent home care composition. For example, the total weight of the effervescent base may be present in an amount sufficient to optimize (e.g., minimize and/or control) dissolution time of the effervescent home care composition.

The effervescent base may include the one or more alkali metal carbonates and the one or more acids in a weight ratio of from about 1:1 to about 5:1. For example, the effervescent base may include the one or more alkali metal carbonates and the one or more acids in a weight ratio of from about 1:1, about 1.2:1, about 1.4:1, about 1.6:1, about 1.8:1, about 2:1, about 2.2:1, about 2.4:1, about 2.6:1, or about 2.7:1 to about 2.8:1, about 2.9:1, about 3:1, about 3.1:1, about 3.2:1, about 3.3:1, about 3.4:1, about 3.5:1, about 3.6:1, about 3.7:1, or about 5:1. In an exemplary implementation, the effervescent base may include the one or more alkali metal carbonates and the one or more acids in a weight ratio of from about 2.5:1 to 3:1, about 2.6:1 to about 2.9:1, more preferably about 2.7:1 to about 2.8:1. The ratio of the one or more acids and the one or more alkali metal carbonates may at least partially determine a dissolution time or minimum dissolution time of the effervescent home care composition. For example, the one or more acids and the one or more alkali metal carbonates may be present in a weight ratio sufficient to optimize (e.g., minimize and/or control) dissolution time of the effervescent home care composition.

The one or more surfactants may be or include, one or more anionic surfactants, one or more nonionic surfactants, one or more cationic surfactants, one or more amphoteric or zwitterionic surfactants, or combinations thereof. In a preferred implementation, the one or more surfactants includes one or more anionic surfactants. The one or more surfactants may be or include sulfate-free surfactants. The one or more surfactants may also be or include sulfate-based surfactants. In another example, the one or more surfactants may be or include sulfonate-based surfactants.

Illustrative anionic surfactants may be or include, but are not limited to, one or more C6-C18 fatty acid glutamate salts, water-soluble salts of C8-C20 alkyl sulfates, sulfonated monoglycerides of C8-C20 fatty acids, sarcosinates, taurates, sodium lauryl sulfate (SLS), SLS powder, SLS granules, SLS solid, sodium cocoyl monoglyceride sulfonate, sodium lauryl sarcosinate, sodium lauryl isoethionate, sodium laureth carboxylate, sodium lauroyl methyl taurate, sodium dodecyl benzenesulfonate, water-soluble salts of higher fatty acid monoglyceride monosulfates, such as the sodium salt of the monosulfated monoglyceride of hydrogenated coconut oil fatty acids such as a sodium N-methyl-N-alkyl taurate, sodium N-methyl-N-cocoyl taurate, sodium methyl cocoyl taurate, sodium cocoyl methyl taurate, sodium lauroyl methyl taurate, sodium cocomonoglyceride sulfate; higher alkyl sulfates, such as sodium lauryl sulfate; higher alkyl-ether sulfates, e.g., of formula $CH_3(CH_2)_mCH_2(OCH_2CH_2)_nOSO_3X$, wherein m is 6-16, e.g., 10, n is 1-6, e.g. 2, 3 or 4, and X is Na, for example sodium laureth-2 sulfate ($CH_3(CH_2)_{10}CH_2(OCH_2CH_2)_2OSO_3Na$); higher alkyl aryl sulfonates such as sodium dodecyl benzene sulfonate (sodium lauryl benzene sulfonate); higher alkyl sulfoacetates, such as sodium lauryl sulfoacetate (dodecyl sodium sulfoacetate), higher fatty acid esters of 1,2 dihydroxy propane sulfonate, sulfocolaurate (N-2-ethyl laurate potassium sulfoacetamide), sodium lauryl sarcosinate, a natural derived surfactant, a bio-based surfactant, such as fatty alcohol ethoxylates formed by reacting 100% bio-based ethylene oxide with a 100% bio-based fatty alcohol, ethoxylated fatty alcohol, such as ECO NATRASENSE™ 265 MBAL, which is commercially available from Croda International of Snaith, United Kingdom, or the like, or any mixture or combination thereof. As used herein, "higher alkyl" may refer to a C6-C30 alkyl. In a preferred implementation, the anionic surfactant may be or include sodium lauryl sulfate, NATRASENSE™ 265 MBAL, an ethoxylated fatty alcohol formed by reacting 100% biobased ethylene oxide with a 100% bio-based fatty alcohol, ECO Brij™ L7L, a 100% bio-based nonionic surfactant produced from a naturally occurring straight chain lauryl alcohol, Rhodasurf® 6 NAT (CAS: 68439-50-9), or combinations thereof. The one or more anionic surfactants may also be or include, but are not limited to, a taurate, a succinate, a sarcosinate, an isethionate, a carboxylate, a lactylate, a glutamate, a glycinate, a sulfoacetate, a sulfonate surfactant, or combinations thereof. Illustrative anionic surfactants may also be or include, but are not limited to, sodium n-methyl-n-oleyl taurate, sodium cocoyl isethionate, sodium capryloyl isethionate, sodium caproyl isethionate, sodium lauroyl isethionate, sodium palmitoyl isethionate, sodium diisobutyl sulfosuccinate, sodium diamyl sulfosuccinate, di-N-hexyl sodium sulfosuccinate, disodium lauryl sulfosuccinate, disodium laureth sulfosuccinate, disodium PEG-12 dimethicone sulfosuccinate, sodium oleyl sarcosinate, sodium laurate, sodium myristate, sodium palmitate, sodium stearate, sodium lauroyl lactylate, sodium palmitoyl lactylate, sodium stearoyl lactylate, sodium cocoyl glutamate, disodium cocoyl glutamate, sodium lauroyl glycinate, sodium lauryl sulfoacetate, stearyltoluene sodium sulfonate, sodium diamyl sulfosuccinate, sodium pentanesulfonate, a linear alkyl benzene sulfonate (e.g., sodium dodecylbenzene-sulfonate or ammonium dodecylbenzenesulfonate), alkyl-benzene sulfonates, sodium 1-butanesulfonate, sodium lignosulfonate, sodium n-octyl sulfonate, an alpha olefin sulfonate, or combinations thereof.

In at least one implementation, the anionic surfactants utilized in the effervescent home care composition does not include one or more alkyl sulfate salts, such as sodium lauryl sulfate. For example, the effervescent home care composition may be free or substantially free of sulfate containing surfactants, such as sodium lauryl sulfate. Illustrative sulfate-containing surfactants may be or include, but are not limited to, sodium lauryl sulfate (SLS), ammonium lauryl sulfate (ALS), sodium laureth sulfate (SLES), ammonium laureth sulfate (ALES), or the like. The anionic surfactants may be or include biobased anionic surfactants.

In at least one implementation, the sulfate-free surfactants may be or include a taurate-based surfactant. Illustrative taurate-based surfactants may be or include, but are not limited to, sodium methyl lauroyl taurate, sodium methyl myristoyl taurate, potassium methyl myristoyl taurate, sodium methyl cocoyl taurate, sodium methyl oleoyl taurate, calcium methyl lauroyl taurate, potassium methyl lauroyl taurate, ammonium methyl lauroyl taurate, levulinic derived surfactants, or the like, or combinations thereof.

In at least one embodiment, the effervescent home care composition includes at least one nonionic surfactant. Illustrative nonionic surfactants include, but are not limited to water soluble nonionic surfactants, such as primary aliphatic alcohol ethoxylates, secondary aliphatic alcohol ethoxylates, alkylphenol ethoxylates, and ethylene-oxide propylene oxide condensates on primary alkanols, or the like, and mixtures thereof. For example, the nonionic surfactants may be or include PLURAFAC®, commercially available from BASF Corp. of Florham Park, NJ In another example, the nonionic surfactants may be or include condensates of ethylene oxide with sorbitan fatty acid esters such as polysorbates. Polysorbates refer to a family of amphipathic, nonionic surfactants that are derived from ethoxylated sorbitan or isosorbide (a derivative of sorbitol) esterified with fatty acids, such as those available under the TWEEN® trade names, which are commercially available from ICI Surfactants of New York, NY The nonionic surfactants may also be or include INCROCAS® (CAS: 61791-12-6; polyoxyl 35 Castor Oil) commercially available from Croda, and the ALKEST TW Line (CAS: 9005-64-5; polysorbate), commercially available from Oxiteno of Sao Paulo, Brazil.

The nonionic surfactant of the effervescent home care composition may also be or include a higher aliphatic, C9-C15 primary alcohol. For example, the nonionic surfactant may be a reaction product (e.g., a condensation product) of C9-C15 or C9-C11 alkanol and 2.5 to 10 moles of ethylene oxide, C12-C13 alkanol and 6.5 moles of ethylene oxide, C12-C15 alkanol and 12 moles of ethylene oxide, C14-C15 alkanol with 13 moles ethylene oxide, and the like. For example, the nonionic surfactants may be or include NEODOL® 91-2.5, 91-5, 91-6, 91-8, or 91-8.4, NEODOL® 23-6.5, NEODOL® 25-12, NEODOL® 45-13, NEODOL® 135, NEODOL® 67, or the like, all of which are commercially available from Shell Corp. of Houston, TX NEODOL is a tradename of Shell Corp. of Houston, TX for its alcohol ethoxylate surfactants. Other suitable nonionic surfactants are described in International Publication WO 2007/001593 to The Clorox Company, and U.S. Pat. No. 6,342,473 to Kott et al., the disclosures of which are incorporated herein by reference. In an exemplary implementation, the nonionic surfactant includes at least one NEODOL surfactant or at least one higher aliphatic, primary alcohol. In an exemplary implementation, the at least one NEODOL surfactant or the at least one higher aliphatic, primary alcohol may be a liquid surfactant capable of or configured to facilitate or aid in preparing a homogenous mixture of the components of the effervescent home care composition. The at least one NEODOL surfactant or the at least one higher aliphatic, primary alcohol may also be a liquid surfactant capable of or configured to act as a carrier in the effervescent home care composition.

The one or more surfactants may be present in an amount of from about 2 weight % to about 50 weight %, based on a total weight of the effervescent home care composition. For example, any one or more of the surfactants may be present in an amount of from about 2 weight %, about 3 weight %, about 4 weight %, about 5 weight %, about 6 weight %, about 7 weight %, or about 8 weight %, to about 9 weight %, about 10 weight %, about 11 weight %, or about 12 weight %, based on the total weight of the effervescent home care composition. In another example, any one or more of the surfactants may be present in an amount of from about 5 weight % to about 50 weight %, about 10 weight % to about 45 weight %, about 15 weight % to about 40 weight %, about 20 weight % to about 35 weight %, about 20 weight % to about 30 weight %, or about 25 weight % to about 30 weight %, based on the total weight of the effervescent home care composition. The amount of the one or more surfactants present in the effervescent home care composition may at least partially determine a dissolution time or minimum dissolution time of the effervescent home care composition. For example, the surfactants may be present in an amount sufficient to minimize dissolution time of the effervescent home care composition.

It should be appreciated that the respective concentration of any one or more of the surfactants may at least partially determine the stability of the effervescent home care composition, and/or the final appearance of the effervescent home care composition. As used herein, the term or expression "appearance" may refer to one or more attributes, including, but not limited to, glossiness, friability, hardness, homogeneity, porosity, or the like, the definitions of which are known to those having ordinary skill in the art.

The effervescent home care composition may include one or more disintegrant agents capable of or configured to aid or facilitate the dissolution of the effervescent home care composition. For example, the one or more disintegrant agents may be capable of or configured to disrupt at least a portion of the effervescent home care composition when contacted with a solvent (e.g., water). The one or more disintegrant agents may also be capable of or configured to coat or envelop one or more of the remaining components of the effervescent home care composition. The disintegrant agents may be or include, but are not limited to, organic materials, such as starches, or inorganic materials. Illustrative starches may be or include, but are not limited to corn, maize, rice, and potato starches, and starch derivatives, such as PRIMOJEL®, sodium carboxymethyl starch (CAS: 9063-38-1), EXPLOTAB®, sodium starch glycolate, celluloses and cellulose derivatives, for example, COURLOSE® and NYMCEL®, sodium carboxymethyl cellulose (CAS: 9004-32-4), AC-DI-SOL® cross-linked modified cellulose (CAS 74811-65-7), and HANFLOC® microcrystalline cellulosic fibers (CAS: 1302-42-7); and various synthetic organic polymers, notably polyethylene glycol; crosslinked polyvinylpyrrolidone, for example, POLYPLASDONE® XL-10 or XL or KOLLIDON® CL, 1-ethenylpyrrolidin-2-one (CAS: 94800-10-9). Illustrative inorganic swelling disintegrants may include bentonite clay. In an exemplary implementation, the one or more disintegrant agents include one or more of polyvinylpyrrolidone (PVP), sodium starch glycolate, cross-linked carboxymethyl cellulose (croscarmellose), sodium starch glycolate, polyvinyl pyrrolidone, sago starch, isphagula husk, calcium silicate, soy polysaccharides, or combinations thereof.

The one or more disintegrant agents may be present in the effervescent home care composition in an amount of from greater than 0 weight % to about 10 weight %, based on the total weight of the effervescent home care composition. For example, any one or more of the disintegrant agents may be present in an amount of from greater than 0 weight %, about 1 weight %, about 2 weight %, about 3 weight %, about 4 weight %, or about 5 weight % to about 6 weight %, about 7 weight %, about 8 weight %, about 9 weight %, or about 10 weight %, based on the total weight of the effervescent home care composition. In another example, any one or more of the disintegrant agents may be present in an amount of from greater than 0 weight % to about 7 weight %, about 2 weight % to about 5 weight %, or about 3 weight % to about 4 weight %, based on the total weight of the effervescent home care composition.

The effervescent home care composition may include one or more solidifying agents or binders capable of or configured to aid or facilitate the binding of the components of the effervescent home care composition in the formed article. For example, the one or more solidifying agents or binders may be capable of or configured to hold the components of the effervescent home care composition in a tablet or bar form. The solidifying agents or binders may also be capable of or configured to facilitate the homogenous dispersion or distribution of one or more of the remaining components of the effervescent home care composition. It should be appreciated that any one or more of the binders disclosed herein may also function as a disintegrant agent and facilitate the dissolution of the effervescent home care composition in solution. Similarly, one or more of the disintegrant agents disclosed herein may also function as a binder. It should further be appreciated that any one or more of the binders may also function as or include one or more of the surfactants disclosed herein. For example, the one or more binders may be or include powdered or solid surfactants. The one or more binders may be or include one or more surfactants, such as, sodium lauryl sulfate (SLS), ammonium lauryl sulfate (ALS), sodium laureth sulfate (SLES), ammonium laureth sulfate (ALES), alkyl polyglucoside (APG) solid, sodium dodecylbenzenesulfonate (NaDDBS), or the like, or combinations thereof. Illustrative binders or solidifying agents may be or include, but are not limited to, polypropylene glycol polyoxyalkylene, polyethylene glycol, or the like, or combinations thereof.

In at least one exemplary implementation, the one or more solidifying agents or binders include polyethylene glycol (PEG), polypropylene glycol (PPG), or a combination thereof (PEG/PPG). The PEG and/or the PPG may be or include low molecular weight PEG and/or PPG, high molecular weight PEG and/or PPG, or combinations thereof. In at least one implementation, the effervescent home care composition or the binders thereof includes a binary system of both high and low molecular weight PEG and/or PPG. As used herein, low molecular weight PEG and/or PPG may refer to PEG/PPG having a molecular weight of from about 2,000 Da to about 5,000 Da. As used herein, high molecular weight PEG/PPG may refer to PEG/PPG having a molecular weight of from about 5,500 Da to about 8,000 Da. The low molecular weight PEG and/or PPG may be a liquid at room temperature and the high molecular weight PEG and/or PPG may be a solid at room temperature. The low molecular weight PEG and/or PPG may provide a solvent or facilitate the solubility of any one or more components of the effervescent home care composition. The high molecular weight PEG and/or PPG may facilitate the formation of the formed article (e.g., tablet, bar, etc.). In at least one implementation, the binary system including the combination of the low and high molecular weight PEG and/or PPG may provide one or more benefits including, improved hardness, improved weight uniformity, improved friability, improved disintegration, improved dissolution, or combinations thereof. The low molecular weight PEG and/or PPG in the binary system may at least partially act as a crosslinker with the high molecular weight PEG and/or PPG to form a soluble matrix capable of or configured to provide the one or more aforementioned benefits.

The one or more solidifying agents or binders may be present in the effervescent home care composition in an amount of from about 15 weight % to about 40 weight %. For example, any one or more of the binders may be present in an amount of from about 15 weight %, about 20 weight %, or about 25 weight % to about 30 weight %, about 35 weight %, or about 40 weight %, based on the total weight of the effervescent home care composition. In a preferred implementation, the one or more binders are present in an amount of from about 20 weight % to about 35 weight %, or more preferably about 25 weight % to about 30 weight %. The amount of the solidifying agents present in the effervescent home care composition may at least partially determine a dissolution time or minimum dissolution time of the effervescent home care composition. For example, the solidifying agents may be present in an amount sufficient to minimize dissolution time of the effervescent home care composition.

In an exemplary implementation, the one or more solidifying agents include polypropylene glycol polyoxyalkylene and polyethylene glycol. The polypropylene glycol polyoxyalkylene and the polyethylene glycol may be present in the effervescent home care composition in a weight ratio of from greater than or equal to about 0.8:1 to about 3:1. For example, the polypropylene glycol polyoxyalkylene and the polyethylene glycol may be present in the effervescent home care composition in a weight ratio of from greater than or equal to 0.8:1 to less than or equal to about 3:1, less than or equal to about 2.5:1, less than or equal to about 2:1, less than or equal to about 1.8:1, less than or equal to about 1.7:1, less than or equal to about 1.6:1, less than or equal to about 1.5:1, or less. The weight ratio of the polypropylene glycol polyoxyalkylene to the polyethylene in the effervescent home care composition may at least partially determine a dissolution time or minimum dissolution time of the effervescent home care composition. The weight ratio of the polypropylene glycol polyoxyalkylene to the polyethylene in the effervescent home care composition may also at least partially determine the hardness, stability, friability, or combinations thereof, of the effervescent home care composition. In one embodiment, the ratio is directly related to the hardness, stability, and friability, of the effervescent home care composition. For example, the polypropylene glycol polyoxyalkylene and the polyethylene may be present in a weight ratio sufficient to minimize dissolution time of the effervescent home care composition.

The effervescent home care composition may include one or more descaling agents. The one or more descaling agents may be or include, but are not limited to, one or more organic acids, such as benzoic acid, salicylic acid, sorbic acid, oxalic acid, malic acid, fumaric acid, lactic acid, citric acid, tartaric acid, ascorbic acid, succinic acid, or the like, or any combination thereof. In a preferred implementation, the one or more descaling agents includes lactic acid.

It should be appreciated that the effervescent home care compositions disclosed herein are completely or substantially soluble in tap water. Tap water contains contaminants, such as metal salts, organic matter, bacteria, or the like, or combinations thereof, which significantly limits ingredients choices as well as presents challenges for formulation of a safe and effective home care product and home care composition. For example, metals (e.g., calcium, magnesium, zinc) that are dissolved in tap water can react with certain chemicals (e.g., carboxylic acids) to form insoluble complexes that hinder the formulation of a tablet that dissolves completely.

The one or more descaling agents may be present in an amount of from greater than 0 weight % to about 10 weight %, based on the total weight of the effervescent home care composition. For example, any one or more of the descaling agents may be present in an amount of from greater than 0 weight % to about 1 weight %, about 2 weight %, about 3 weight %, about 4 weight %, about 5 weight %, about 6 weight %, about 8 weight %, or about 10 weight %, based on the total weight of the effervescent home care composition.

The effervescent home care composition may include one or more additional ingredients capable of or configured to provide added functional effect or to make the compositions more appealing to consumers. Such ingredients may be or include, but are not limited to, perfumes, fragrances, colorants (e.g., pigments, dyes, etc.), abrasive agents (e.g., sodium chloride, magnesium chloride, sodium bicarbonate, and/or sodium chloride), solvents, such as glycerin, propanediol, disinfectants, enzymes, antioxidants, bleaches, chelating agents (e.g., citric acid), antibacterial agents/preservatives, trichloroisocyanuric acid (TCCA), orthobenzylparachlorophenol (OBCP), sodium percarbonate, perborate, N,N,N'N'-tetraacetyl ethylenediamine (TAED), and didecyldimethylammonium chloride (DDAC), optical brighteners, opacifiers, hydrotropes, or the like, or any combination thereof. These ingredients would be known to persons skilled in the art of home care products and compositions thereof. The magnesium chloride may provide auditory and/or visual cues to the consumer when contacted with the solvent (e.g., water). For example, the magnesium chloride may generate a sound (e.g., crackling or fizzing) when contacted with water to indicate the initiation of dissolution or the like.

In at least one implementation, any one or more of the additional ingredients may be present in an amount of from greater than 0 weight % to about 10 weight %, based on the total weight of the effervescent home care composition. For example, any one or more of the additional ingredients may be present in an amount of from greater than 0 weight % to about 1 weight %, about 2 weight %, about 3 weight %, about 4 weight %, about 5 weight %, about 6 weight %, about 8 weight %, or about 10 weight %, based on the total weight of the effervescent home care composition. In another example, any one or more of the additional ingredients may be present in an amount of from greater than 0 weight % to about 10 weight %, about 2 weight % to about 8 weight %, or about 4 weight % to about 6 weight %, based on the total weight of the effervescent home care composition, or any combination thereof. For example, the effervescent home care composition may include fragrances and/or dyes in an amount of from greater than 0 weight % to about 10 weight %, about 2 weight % to about 8 weight %, or about 4 weight % to about 6 weight %, based on the total weight of the effervescent home care composition, or any combination thereof.

As discussed above, the compositions disclosed herein may also include respective solutions formed or prepared from contacting the effervescent home care compositions with a solvent. For example, the compositions disclosed herein may include the respective solutions formed or prepared from combining, mixing, or otherwise contacting the effervescent home care compositions with water. The water may be water from any source. For example, the water may be deionized water, distilled water, tap water, or combinations thereof. In a preferred implementation, the water is tap water.

The solutions prepared from the effervescent home care compositions may be or include, but are not limited to, compositions designed to clean soils materials and/or surfaces or substrates, laundry cleaning compositions and detergents, fabric enhancing compositions, fabric softening compositions, fabric freshening compositions, laundry prewash or pretreat, spray products, dishwashing compositions, hard surface cleansers, including natural, artificial, or synthetic surfaces, dishwashing detergents, or the like, or combinations thereof. In a preferred implementation, the solutions prepared from the effervescent home care compositions disclosed herein may be hard surface cleansers.

In at least one implementation, the solutions prepared from the effervescent home care compositions may provide comparable (e.g., parity) or relatively greater cleaning performance as compared to commercially available cleaners. For example, the solutions prepared from the effervescent home care compositions may provide comparable (e.g., parity) or relatively greater cleaning performance with respect to grease removal, multi-surface cleaning, foam formation, or combinations thereof, as compared to commercially available cleaners. In another example, the solutions prepared from the effervescent home care compositions may provide comparable (e.g., parity) or reduced amounts of residue after cleaning a surface as compared to commercially available cleaners. The solutions prepared from the effervescent home care compositions may provide comparable (e.g., parity) or relatively greater fragrance release as compared to commercially available cleansers. The solutions prepared from the effervescent home care compositions may provide comparable (e.g., parity) or relatively longer fragrance release as compared to commercially available cleaners.

In at least one implementation, the effervescent home care composition may include one or more pearlizing and/or opacifying agents to thereby provide an opaque liquid home care composition. In another implementation, the effervescent home care composition may be free or substantially free of pearlizing and/or opacifying agents. For example, the solutions prepared from contacting the effervescent home care compositions with water may be clear, transparent, or semi-transparent. The solutions prepared from contacting the effervescent home care compositions with water may be free or substantially free of debris, sediment, precipitate, or the like, or combinations thereof. The solutions prepared from contacting the effervescent home care compositions with water may be free or substantially free of debris, sediment, precipitate, or the like, or combinations thereof with or without agitation. For example, the solutions prepared from contacting the effervescent home care compositions with water may be free or substantially free of debris without exogenous agitation, such as stirring, mixing, shaking, or combinations thereof. In another example, the solutions prepared from contacting the effervescent home care compositions with water may be free or substantially free of debris with minor exogenous agitation, such as stirring, mixing, shaking, or combinations thereof. In yet another embodiment, the solutions prepared from contacting the effervescent home care compositions with water may contain minimal debris, sediment, precipitate, or the like, or combinations thereof with or without agitation.

The effervescent home care compositions may have a dissolution time of from greater than 0 minutes (min) to less than or equal to about 20 min, less than or equal to about 15 min, less than or equal to about 13 min, less than or equal to about 12 min, less than or equal to about 11 min, less than or equal to about 10 min, less than or equal to about 9 min, less than or equal to about 8 min, less than or equal to about 7 min, or less. The effervescent home care compositions may also have a dissolution time of from about 6 min to about 12 min, from about 7 min to about 11 min, or from about 8 min to about 10 min. As used herein, the dissolution time may refer to the amount of time elapsed for complete or substantial dissolution of the effervescent home care composition in water. The dissolution time may be determined from the time of contact with water to complete dissolution or when no more dissolution occurs. The dissolution time may be determined with about 120 grams (g) of the effervescent home care composition in about 6000 g of water at room temperature. The dissolution time may also be determined with about 5 to 6 grams of the effervescent home care composition in about 1 liter of water at room temperature.

In an exemplary implementation, the solid effervescent cleansing compositions disclosed herein may include one or more of the following: an effervescent base in an amount of from about 35 weight % to about 45 weight %, about 36 weight % to about 44 weight %, or about 38 weight % to about 42 weight %, based on the total weight of the effervescent home care composition; one or more alkali metal carbonates (e.g., sodium bicarbonate) and one or more acids (e.g., citric acid), wherein the alkali metal carbonates and the acids are present in a weight ratio of from about 2:1 to about 4:1, about 2.4:1 to about 3:1, or about 2.7:1; one or more disintegrant agents; one or more solidifying agents or binders, such as polypropylene glycol polyoxyalkylene and polyethylene glycol, wherein the polypropylene glycol polyoxyalkylene and the polyethylene glycol are present in a weight ratio of greater than or equal to about 1 to less than or equal to about 1.7, less than or equal to about 1.6, or less than or equal to about 1.5; one or more solidifying agents or binders in a total amount of from about 20 weight % to about 35 weight %, about 25 weight % to about 30 weight %, or about 27 weight % to about 28 weight %, based on the total weight of the effervescent home care composition; one or more surfactants in an amount of from about 20 weight % to about 35 weight %, about 25 weight % to about 30 weight %, or about 27 weight % to about 28 weight %, based on the total weight of the effervescent home care composition; one or more additional ingredients, such as fragrances and/or colorants (e.g., dyes), in an amount of from greater than 0 weight % to about 10 weight %, about 2 weight % to about 8 weight %, or about 4 weight % to about 6 weight %, based on the total weight of the effervescent home care composition, or any combination thereof.

In another exemplary implementation, the solid effervescent cleansing compositions disclosed herein may include the effervescent base or mix in an amount of from about 37 weight % to about 44 weight %, about 38 weight % to about 43 weight %, or about 38.95 weight % to about 43.05 weight %, where the effervescent ratio may be from about 2.6 to about 2.8, about 2.65 to about 2.75, or about 2.73. The solid effervescent cleansing composition may also have the polypropylene glycol polyoxyalkylene and polyethylene glycol in a total amount of from about 25 weight % to about 30 weight %, wherein the polypropylene glycol polyoxyalkylene and the polyethylene glycol are present in a weight ratio of from about 1 to less than or equal to 1.5. The solid effervescent cleansing composition may include solid or powdered surfactants (e.g., solidifying agents or binders) in an amount of from about 25 weight % to about 30 weight %, liquid surfactants in an amount of from about 2 weight % to about 5 weight %, fragrance(s) from about 2 weight % to about 8 weight %, and/or abrasives (e.g., sodium bicarbonate and/or sodium chloride) in an amount of from about 0.5 weight % to about 2 weight %. The solid effervescent cleansing composition may have a dissolution time of from about 7 min to about 11 min or about 7.4 min to about 10.2 min.

Methods

The present disclosure may provide methods for preparing the effervescent home care compositions. The method may include contacting the effervescent base or carrier, the one or more surfactants, the one or more solidifying agents (e.g., cross-linkers), the one or more descaling agents, the one or more chelating agents, the one or more abrasives, the one or more disintegrant agents, the one or more additional components, or any combination thereof, with one another to prepare a mixture, such as a homogenous mixture. The method may also include forming or preparing the solid formed articles from the mixture via one or more processes (e.g., casting, melting, melt casting, pressing, extruding, etc.).

The present disclosure may also provide a method for preparing solutions from the effervescent home care compositions disclosed herein. The method for preparing solutions may include combining, mixing, stirring, or otherwise contacting the effervescent home care composition with water. The method for preparing the solutions may also include agitating the solution after contacting the effervescent home care composition with water.

The present disclosure may further provide a method for improving dissolution of the effervescent home care composition in a solvent. The method may include providing the effervescent base in an amount of from about 35 weight % to about 45 weight %, about 36 weight % to about 44 weight %, or about 38 weight % to about 42 weight %, based on the total weight of the effervescent home care composition. The method may also include providing sodium bicarbonate and citric acid in a weight ratio of from about 2:1 to about 4:1, about 2.4:1 to about 3:1, or about 2.7:1. The method may also include providing the disintegrant agents in an amount of from greater than 0 weight % to about 10 weight %, about 1 weight % to about 9 weight %, about 2 weight % to about 8 weight %, about 3 weight % to about 7 weight %, or about 4 weight % to about 6 weight %, based on the total weight of the effervescent home care composition. The method may further include providing one or more solidifying agents or binders, such as polypropylene glycol polyoxyalkylene and polyethylene glycol, wherein the polypropylene glycol polyoxyalkylene and the polyethylene glycol are present in a weight ratio of greater than or equal to about 1 to less than or equal to about 1.7, less than or equal to about 1.6, or less than or equal to about 1.5. The method may also include providing the solidifying agents in an amount of from about 20 weight % to about 35 weight %, about 25 weight % to about 30 weight %, or about 27 weight % to about 28 weight %, based on the total weight of the effervescent home care composition. The method may also include providing the surfactants in an amount of from about 20 weight % to about 35 weight %, about 25 weight % to about 30 weight %, or about 27 weight % to about 28 weight %, based on the total weight of the effervescent home care composition. The method may also include providing one or more additional ingredients, such as fragrances and/or colorants (e.g., dyes), in an amount of from greater than 0 weight % to about 10 weight %, about 2 weight % to about 8 weight %, or about 4 weight % to about 6 weight %, based on the total weight of the effervescent home care composition.

The present disclosure may also provide methods for preparing solutions from the effervescent home care compositions disclosed herein with one or more improved sensory properties (e.g., foaming). The sensory properties may be determined or evaluated by an Expert Sensory Panel. The sensory properties may be evaluated via a blind sequential monadic block design. The sensory properties may be evaluated using a standardized methodology and a point assessment scale, such as a 0-5, 0-10, or a 0-15 point assessment scale, where '0' represents the lowest value. Each of the panelists may evaluate each of the foams produced with the respective solutions for a range of sensory properties or characteristics including, but not limited to: product attributes before and during washing, lather attributes on pouf and hands during washing, skin feel attributes on hands and forearms during rinsing and after drying, or the like, or combinations thereof.

EXAMPLES

The examples and other implementations described herein are exemplary and not intended to be limiting in describing the full scope of compositions and methods of this disclosure. Equivalent changes, modifications and variations of specific implementations, materials, compositions and methods may be made within the scope of the present disclosure, with substantially similar results.

Example 1

Exemplary concentrated solid cleansing compositions (1)-(5) were prepared for evaluation by combining the components according to Table 1. Each of the solid cleansing compositions (1)-(5) was prepared as a bar having a weight of about 120 grams (g), which may be combined with water to produce about 6000 g of a liquid cleansing composition or solution. To prepare each of the respective bars, the alkali metal carbonate, sodium chloride, and acid were contacted with one another to prepare an effervescent mix. An anionic surfactant was then added to the effervescent mix. Alcohol ethoxylated surfactants and fragrance were then contacted with the effervescent mix. The dyes were then added to produce a mixture of powders. Heated polyethylene glycol and polypropylene glycol polyoxyalkylene were then added and mixed to prepare a liquid mixture. The liquid mixture was then cast into a mold and allowed to cool.

TABLE 1

Concentrated Solid Cleansing Compositions (1)-(5)

| COMPONENT | (1) (wt. %) | (2) (wt. %) | (3) (wt. %) | (4) (wt. %) | (5) (wt. %) |
|---|---|---|---|---|---|
| Alkali Metal Carbonate | 17.48 | 26.19 | 20.32 | 20.83 | 13 |
| NaCl | 16.19 | 24.25 | 18.82 | 19.29 | 12 |
| Acid | 6.47 | 9.70 | 7.53 | 7.72 | 5 |
| Anionic Surfactant | 4.45 | 4.17 | 1.61 | 4.06 | 22.5 |
| Alcohol Ethoxylate Surfactant | 14.61 | 6.68 | 15.93 | 11.14 | 5 |
| Lactic Acid | 11.57 | 0.33 | 8.57 | 9.55 | — |
| Polypropylene Glycol Polyoxyalkylene | 20.42 | 19.28 | 17.80 | 18.38 | 21.2 |
| Polyethylene Glycol | 7.84 | 7.07 | 6.84 | 7.36 | 18 |
| Excipients | Balance | Balance | Balance | Balance | Balance |
| Total | 100.0 | 100.0 | 100.0 | 100.0 | 100.0 |

Solid cleansing composition (1) exhibited a sufficient physical appearance. Specifically, the solid cleansing composition (1) had a smooth surface morphology and was relatively robust or hard, thereby reducing flaking. The solid cleansing composition (1) also had sufficient friability, porosity, and shine/matte. Solid cleansing composition (2) exhibited a granular surface texture, which was attributed to the increased amount of abrasive agents, namely, alkali metal carbonate and sodium chloride. Solid cleansing composition (3) included reduced amounts of the abrasive agents (i.e., alkali metal carbonate and sodium chloride), and increased amounts of the alcohol ethoxylate surfactant, a nonionic surfactant. Solid cleansing composition (3) exhibited a relatively shinier appearance as compared to solid cleansing compositions (1) and (2), and improved texture (i.e., smoother surface texture) as compared to the solid cleansing composition (2). The solid cleansing composition (4) included relatively less of the nonionic surfactant and increased amounts of the anionic surfactant. The solid cleansing composition (4) exhibited relatively greater distribution and homogeneity as compared to the solid cleansing composition (3). The solid cleansing composition (5) included no lactic acid and increased amounts of the anionic surfactant, polypropylene glycol polyoxyalkylene, and polyethylene glycol.

Example 2

The dissolution time for the solid cleansing composition (5) of Example 1 was evaluated. Specifically, about 5-6 grams of the solid cleansing composition (5) was contacted with about 1 liter (L) of tap water at room temperature. The dissolution time was determined from the time of contact to complete dissolution. The dissolution time for the solid cleansing composition (5) was determined to be about 19 minutes (min) with no sedimentation.

Example 3

Exemplary solid cleansing compositions (6)-(15) were prepared for evaluation by combining the components according to Tables 2a and 2b. Each of the solid cleansing compositions (6)-(14) was prepared as a bar having a weight of about 120 grams (g). Each of the respective bars of the solid cleansing compositions (6)-(14) were prepared similarly to the solid cleansing compositions (1)-(5) of example 1.

The solid cleansing composition (15) was prepared via an extruder, similar to a bar soap process. To prepare the solid cleansing composition (15), all the components were contacted with one another in a container and blended until the color was uniform. The uniform mixture was then added to the extruder and extruded to prepare the solid cleansing composition (15).

TABLE 2a

Concentrated Solid Cleansing Compositions (6)-(10)

| COMPONENT | (6) (wt. %) | (7) (wt. %) | (8) (wt. %) | (9) (wt. %) | (10) (wt. %) |
|---|---|---|---|---|---|
| Alkali Metal Carbonate (MC) | 25 | 25 | 30 | 32 | 27 |
| NaCl | 0 | 0 | 0 | 0 | 0 |
| Acid (A) | 9.25 | 9.25 | 11 | 12 | 10 |
| Ethoxylated Alcohol | 0 | 0 | 0 | 0 | 0 |
| Anionic Surfactant | 10 | 10 | 9 | 8.6 | 9 |
| Alcohol Ethoxylate Surfactant | 10 | 10 | 9 | 9 | 11 |
| Polyvinylpyrrolidone | 2 | 2 | 2 | 4 | 5 |
| Sodium Starch Glycolate | 2 | 2 | 2.5 | 0 | 0 |
| Polypropylene Glycol Polyoxyalkylene (PPG) | 21 | 19.5 | 17 | 17 | 18 |
| Polyethylene Glycol (PEG) | 18 | 19.5 | 17 | 14 | 17 |
| Excipients | Balance | Balance | Balance | Balance | Balance |
| Total | 100.0 | 100.0 | 100.0 | 100.0 | 100.0 |
| Ratio of MC:A | 2.7 | 2.7 | 2.73 | 2.67 | 2.7 |
| Total Effervescent Mix | 34.25 | 34.25 | 41 | 44 | 37 |
| Ratio of PPG:PEG | 1.17 | 1.0 | 1.0 | 1.21 | 1.06 |
| Total PPG and PEG | 39 | 39 | 34 | 31 | 35 |

TABLE 2b

Concentrated Solid Cleansing Compositions (11)-(15)

| COMPONENT | (11) (wt. %) | (12) (wt. %) | (13) (wt. %) | (14) (wt. %) | (15) (wt. %) |
|---|---|---|---|---|---|
| Alkali Metal Carbonate (MC) | 27 | 27 | 27 | 26 | 30 |
| NaCl | 5 | 3 | 2.5 | 0.5 | 1 |
| Acid (A) | 10 | 10 | 10 | 9.6 | 11 |
| Ethoxylated Alcohol | 0 | 0 | 11 | 0 | 0 |
| Anionic Surfactant | 9 | 9 | 9 | 10 | 27.9 |
| Alcohol Ethoxylate Surfactant | 11 | 11 | 0 | 11 | 0 |
| Polyvinylpyrrolidone | 0 | 1 | 0 | 2 | 0 |
| Sodium Starch Glycolate | 0 | 0 | 1 | 0 | 0 |
| Polypropylene Glycol Polyoxyalkylene (PPG) | 18 | 20.6 | 20.6 | 20.5 | 13.6 |
| Polyethylene Glycol (PEG) | 17 | 15 | 15 | 15 | 12 |
| Glycerin | 0 | 0 | 0 | 0 | 4.5 |
| Excipients | Balance | Balance | Balance | Balance | Balance |
| Total | 100.0 | 100.0 | 100.0 | 100.0 | 100.0 |
| Ratio of MC:A | 2.7 | 2.7 | 2.7 | 2.71 | 2.73 |
| Total Effervescent Mix | 37 | 37 | 37 | 35.6 | 41 |
| Ratio of PPG:PEG | 1.06 | 1.37 | 1.37 | 1.37 | 1.13 |
| Total PPG and PEG | 35 | 35.6 | 35.6 | 35.5 | 25.6 |

The dissolution time for each of the solid cleansing compositions (6)-(15) was evaluated according to the procedures discussed with respect to Example 2. The dissolution time of each of the solid cleansing compositions (6)-(15) is summarized in Tables 3a-3b. The presence of sedimentation in the form of precipitate is also summarized in Tables 3a-3b.

TABLE 3a

Dissolution Time of Solid Cleansing Compositions (6)-(11)

| | (6) | (7) | (8) | (9) | (10) | (11) |
|---|---|---|---|---|---|---|
| Dissolution Time (min) | 19.34 | 19.4 | 10.2 | 10.22 | 10.1 | 11.36 |
| Sedimentation | Yes | Yes | Yes | Yes | Yes | No |

[A]Only minimal sedimentation was observed.

TABLE 3b

Dissolution Time of Solid Cleansing Compositions (12)-(15)

| | (12) | (13) | (14) | (15) |
|---|---|---|---|---|
| Dissolution Time (min) | 10.2 | 12 | 9.33 | 7.4 |
| Sedimentation | Min.[A] | No | Yes | Min.[A] |

[A]Only minimal sedimentation was observed.

As illustrated in Tables 3a-3b, the solid cleansing compositions (11), (12), (13), and (15) exhibited minimal or no sedimentation. Among the solid cleansing compositions (11), (12), (13), and (15), however, solid cleansing composition (13) exhibited a relatively longer dissolution time as compared to (11), (12), and (15). Additionally, among the solid cleansing compositions (11), (12), (13), and (15), the solid cleansing composition (15), which was extruded, was too friable; and thus, not mechanically or structurally viable. As such, at least the solid cleansing compositions (11) and (12) exhibited viable or sufficient compositions having relatively low dissolution times. While the solid cleansing composition (14) exhibited sedimentation, the relatively low dissolution time in combination with the viable mechanical and structural properties of the solid cleansing composition (14) provided a viable/sufficient candidate for a solid cleansing composition despite the presence of sedimentation. In view of the foregoing, at least the solid cleansing compositions (11), (12), and (14) provided solid cleansing compositions having sufficient or relatively low dissolution times and sufficient mechanical/structural properties. It should be appreciated that the solid cleansing compositions (11), (12), and (14) had an effervescent mix ratio of about 2.7, which surprisingly and unexpectedly provided improved dissolution times. Further, the total amount of the effervescent mix in solid cleansing compositions (11), (12), and (14) was about 35 wt % to about 37 wt %, and also surprisingly and unexpectedly improved the dissolution time without the inclusion of the disintegrant sodium starch glycolate. It was further surprisingly and unexpectedly observed in the solid cleansing compositions (11), (12), and (14) that the polypropylene glycol polyoxyalkylene to polyethylene glycol ratio alone did not appear to have an impact on the dissolution time. It should be noted that incorporating polyvinylpyrrolidone, sodium starch glycolate, or combinations thereof as disintegrant agents resulted in a significant, unexpected, and surprising reduction in the dissolution times.

While the solid cleansing composition (10) exhibited a relatively faster or lower dissolution time. It should be appreciated that preparing the respective bar of the solid cleansing composition (10) was relatively more complicated due to the increased amount of the polyvinylpyrrolidone.

It should be noted that the ethoxylated alcohol utilized in solid cleansing composition (13) are fatty alcohol ethoxylate surfactants formed by reacting a bio-based ethylene oxide with a bio-based fatty alcohol, and thus, provides a solid cleansing composition that utilizes sustainable components. As further illustrated in Table 3, the inclusion or amount of sodium chloride also affected or had a correlation with the dissolution time.

As illustrated above, the effervescent mixture including the alkali metal carbonate and acid in a weight ratio of about 2.73 was associated with relatively shorter dissolution times.

As demonstrated by solid cleansing compositions (10) and (12), the inclusion of disintegrant agent, PVP, improved the dissolution time as compared to at least solid cleansing compositions (11) and (13). While PVP improved the dissolution time, it should be appreciated that the dissolution time was surprisingly and unexpectedly not correlated with the amount or weight % of the PVP present. Particularly, the solid cleansing composition (10) included 5 wt % of PVP and the solid cleansing composition (12) included 1 wt % PVP, but the dissolution time was substantially similar to one another, suggesting that the amount of the PVP needed to reduce the dissolution time may be about 1 wt % or less.

The solid cleansing composition (13), which utilized sodium starch glycolate as the disintegrant agent also exhibited reduced dissolution time, but the dissolution time was still relatively longer than the compositions utilizing PVP.

As further illustrated above, the total wt % and the ratio of PEG and PPG also contributed to the dissolution time. Specifically, providing a total PPG and PEG of less than 36 wt % resulted in a reduction in dissolution time. Further, a ratio of PPG to PEG of greater than or equal to about 1 and less than or equal to about 1.4, while maintaining the total PPG and PEG to an amount greater than or equal to about 25 wt % and less than or equal to about 38 wt % provided reduced dissolution times for the exemplary solid cleansing compositions disclosed herein.

The present disclosure has been described with reference to exemplary implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. An effervescent composition for preparing a home care product, comprising:

an effervescent base comprising one or more alkali metal carbonates and one or more acids, wherein the one or more alkali metal carbonates and the one or more acids are present in a weight ratio of from about 1:1 to about 5:1;

one or more surfactants;

one or more solidifying agents; and one or more disintegrant agents;

wherein the one or more solidifying agents comprise a combination of polypropylene glycol and polyethylene glycol present in total amount of from 25.6 weight % to 35.6 weight %, based on the total weight of the effervescent composition, wherein the one or more alkali metal carbonates and the one or more acids are present in total amount of from 35.6 weight % to 44 weight %, based on the total weight of the effervescent composition, wherein the polypropylene glycol and the polyethylene glycol are present in a weight ratio of 0.8:1 to 2.5:1, wherein the effervescent composition is substantially free of water, and wherein the effervescent composition comprises a dissolution time of from about 6 min to about 12 min.

2. The effervescent composition of claim 1, wherein the alkali metal carbonates comprises one or more of sodium carbonate, sodium bicarbonate, potassium carbonate, potassium bicarbonate, or combinations thereof.

3. The effervescent composition of claim 1, wherein the one or more acids comprise a monoprotic acid, a polyprotic acid, or combinations thereof.

4. The effervescent composition of claim 1, wherein the alkali metal carbonates are present in an amount of from about 5 weight % to about 75 weight %, based on a total weight of the effervescent composition.

5. The effervescent composition of claim 1, wherein the one or more acids are present in an amount of from about 5 weight % to about 13 weight %, based on a total weight of the effervescent composition.

6. The effervescent composition of claim 1, wherein the one or more alkali metal carbonates and the one or more acids are present in a weight ratio of from about 2.5:1 to 3:1.

7. The effervescent composition of claim 1, wherein the one or more surfactants comprise an anionic surfactant.

8. The effervescent composition of claim 1, wherein the one or more surfactants comprise a nonionic surfactant.

9. The effervescent composition of claim 1, wherein the one or more surfactants are present in an amount of from about 5 weight % to about 50 weight %, based on the total weight of the effervescent composition.

10. The effervescent composition of claim 1, wherein the one or more disintegrant agents comprise one or more of sodium starch glycolate, a crosslinked polyvinylpyrrolidone, or combinations thereof.

11. The effervescent composition of claim 1, wherein the disintegrant is present in an amount of from greater than 0 weight % to about 10 weight %, based on the total weight of the effervescent home care composition.

12. The effervescent composition of claim 1, further comprising one or more descaling agents, the one or more descaling agents are present in an amount of from greater than 0 weight % to 5 weight %, based on the total weight of the effervescent composition.

13. The effervescent composition of claim 1, further comprising one or more abrasive agents.

14. The effervescent composition of claim 1, wherein the effervescent composition is a solid formed article.

15. A method for preparing the effervescent composition of claim 1, the method comprising contacting the effervescent base, the surfactants, the solidifying agents, and the disintegrant agents with one another to prepare a mixture, wherein the mixture is a homogenous mixture.

16. The method of claim 15, further comprising forming a solid formed article from the mixture, wherein the solid formed article is formed from casting, melt casting, pressing, or extruding.

17. A method for preparing a home care product, the method comprising contacting the effervescent composition of claim 1 with a solvent, wherein the solvent comprises water.

* * * * *